United States Patent
Axmann et al.

(10) Patent No.: US 12,091,038 B2
(45) Date of Patent: Sep. 17, 2024

(54) METHOD AND DEVICE FOR SECURELY DISPLAYING ASIL-RELEVANT DATA ON A DISPLAY DEVICE OF A MOTOR VEHICLE

(71) Applicant: MERCEDES-BENZ GROUP AG, Stuttgart (DE)

(72) Inventors: Benjamin Axmann, Schömberg (DE); Christoph Ewen, Stuttgart (DE); Markus Kreuzer, Hochdorf (DE); Achim Proß, Nagold (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/284,963

(22) PCT Filed: Mar. 16, 2022

(86) PCT No.: PCT/EP2022/056824
§ 371 (c)(1),
(2) Date: Sep. 29, 2023

(87) PCT Pub. No.: WO2022/207323
PCT Pub. Date: Oct. 6, 2022

(65) Prior Publication Data
US 2024/0083450 A1   Mar. 14, 2024

(30) Foreign Application Priority Data
Mar. 30, 2021   (DE) .................. 10 2021 001 673.4

(51) Int. Cl.
*B60W 50/14* (2020.01)
*B60K 35/22* (2024.01)
(Continued)

(52) U.S. Cl.
CPC ............. *B60W 50/14* (2013.01); *B60K 35/22* (2024.01); *G06F 11/0796* (2013.01);
(Continued)

(58) Field of Classification Search
CPC . G06T 2207/10016; G06T 2207/10024; G06T 9/00; G06T 2207/30252;
(Continued)

(56) References Cited

U.S. PATENT DOCUMENTS

| 10,152,952 B2 | 12/2018 | Auchmann |
| 2015/0109340 A1 | 4/2015 | Scherm et al. |
| 2016/0307346 A1* | 10/2016 | Staudenmaier ........ B60K 35/00 |

FOREIGN PATENT DOCUMENTS

| DE | 102012207439 A1 | 11/2013 |
| DE | 102015200292 A1 | 7/2016 |

(Continued)

OTHER PUBLICATIONS

International Search Report and Written Opinion mailed Jul. 15, 2022 in related/corresponding International Application No. PCT/EP2022/056824.

(Continued)

*Primary Examiner* — Xiao M Wu
*Assistant Examiner* — Scott E Sonners
(74) *Attorney, Agent, or Firm* — PATENT PORTFOLIO BUILDERS PLLC

(57) ABSTRACT

A method for securely displaying ASIL-relevant data on a display device of a motor vehicle, where the device includes a transmitter unit, a receiver unit, and a display unit to show the images generated by the receiver unit. Images having higher safety ratings are shown on the display unit with less modification by an image enhancement process in comparison with images having lower safety ratings. Information about the safety rating of an image to be displayed is introduced by the transmitter unit into a data stream by a classifying binary code in color bit information of at least one pixel of the image to be displayed via a pixel matrix, in order to control a change of the image during the image (Continued)

Figure 1:
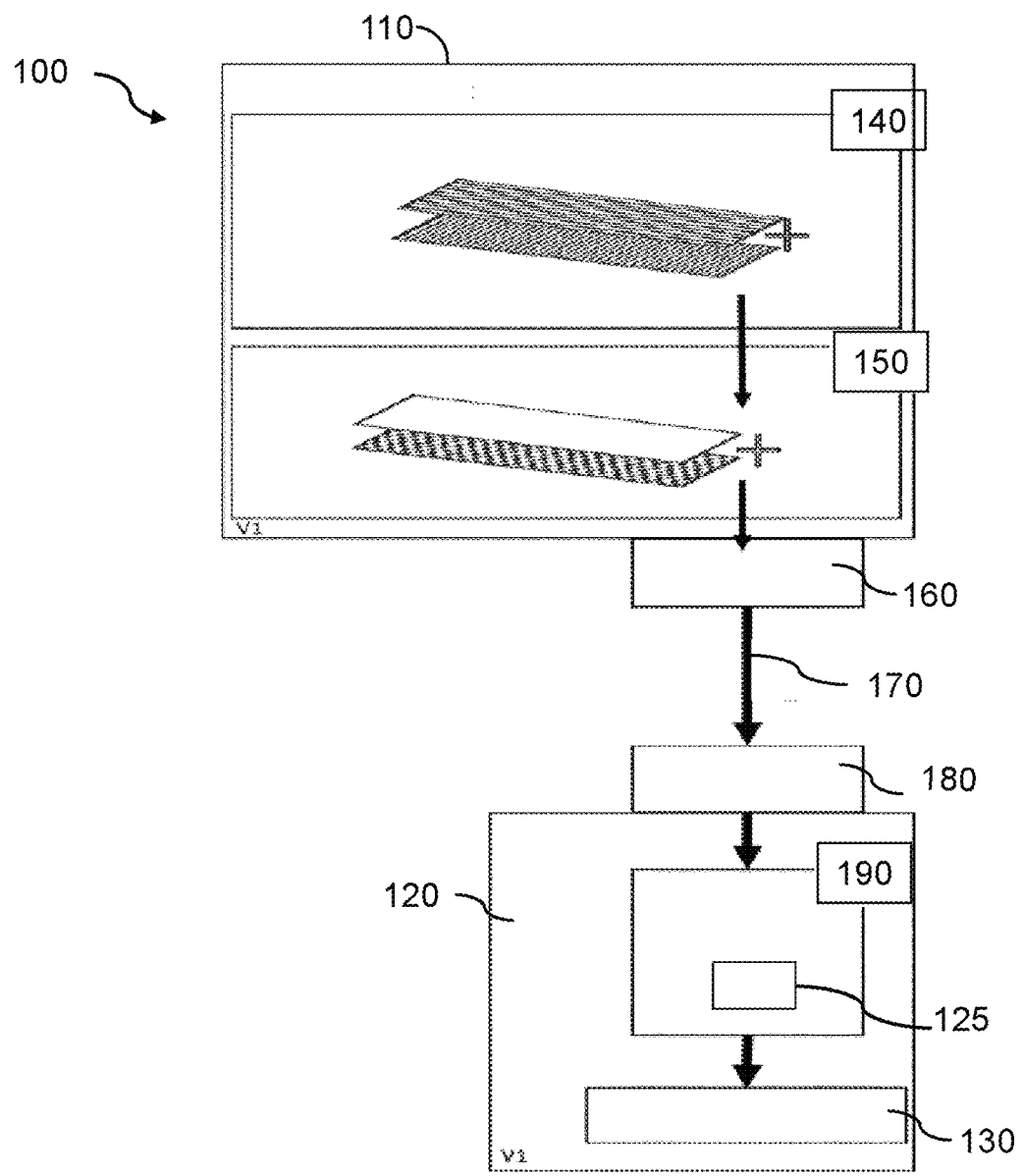

enhancement process in an image enhancer associated with an image-data-outputting receiver unit for images of all safety ratings.

8 Claims, 7 Drawing Sheets

(51) Int. Cl.
G06F 11/07 (2006.01)
G06T 11/00 (2006.01)
(52) U.S. Cl.
CPC ...... *G06T 11/00* (2013.01); *B60K 2360/1523* (2024.01); *B60W 2050/146* (2013.01); *G09G 2380/10* (2013.01)
(58) Field of Classification Search
CPC ..... G06T 1/60; G06T 2200/24; G06T 19/006; G06T 2207/20221; G06T 1/00; G06T 2207/30256; G06T 1/0021; G06T 2207/30236; H04N 19/46; H04N 19/463; H04N 19/467; G09G 2380/12; G09G 2330/04; G09G 2330/12; G09G 2340/12; G09G 2380/10; G09G 5/026; B60W 2420/403; B60W 50/14; G08G 1/168; H04L 67/12; B60K 2360/347; B60K 35/00; B60K 35/213; G06F 3/14
See application file for complete search history.

(56) References Cited

FOREIGN PATENT DOCUMENTS

| | | |
|---|---|---|
| DE | 102019205237 A1 | 10/2020 |
| JP | 2001034250 A | 2/2001 |
| JP | 2003061089 A | 2/2003 |
| JP | 2018136370 A | 8/2018 |

OTHER PUBLICATIONS

Office Action created Jan. 28, 2022 in related/corresponding DE Application No. 10 2021 001 673.4.
Office Action created Nov. 8, 2021 in related/corresponding DE Application No. 10 2021 001 673.4.
Office Action dated Mar. 12, 2024 in related/corresponding Japanese Application No. 2023-558675.

\* cited by examiner

METHOD AND DEVICE FOR SECURELY DISPLAYING ASIL-RELEVANT DATA ON A DISPLAY DEVICE OF A MOTOR VEHICLE

BACKGROUND AND SUMMARY OF THE INVENTION

Exemplary embodiments of the invention relate to a method for securely displaying ASIL-relevant data on a display device of a motor vehicle, in which displays having higher safety ratings are shown by a display unit with less modification by an image enhancement process in comparison with displays having lower safety ratings, and to a device for carrying out the method.

DE 10 2019 205 237 A1 discloses a display of ASIL D information by means of a less secure apparatus. In this case, data having different safety ratings (none or ASIL A, B, C, D) are processed differently in that displays having a higher rating are shown by a display unit with less or no modification (brightening, color optimization etc.) in comparison with displays having a lower rating.

DE 10 2015 200 292 A1 describes a method for securely displaying ASIL-relevant data on a display device of a motor vehicle. In this case, safety-critical and non-safety-critical data are processed separately and independently of one another so as to generate non-safety-critical and safety-critical display elements. In this case, the safety-critical display elements are displayed graphically superimposed on the non-safety-critical display elements in a state displayed by means of the display device. In this case, the safety-critical image data and the non-safety-critical image data are read in separately from one another and, in addition or alternatively, independently of one another. In addition, the safety-critical display elements and the non-safety-critical display elements are output separately from one another and, in addition or alternatively, independently of one another.

Exemplary embodiments of the invention are directed to a method and a device for securely displaying ASIL-relevant data on a display device of a motor vehicle, which provide more precise and more detailed information that allows a conclusion to be drawn about the precise display content.

The abovementioned method involves information about the safety rating of an image to be displayed is introduced into a data stream by a binary code in color bit information of at least one pixel of the image to be displayed via a pixel matrix in order to control a change to the safety-relevant display of the image during the image enhancement process, i.e., to minimize the change or suppress it entirely. The binary code provides information that goes beyond the color information at the pixel level. This also makes it possible to draw conclusions about the type or nature of a particular transferred pixel, which means that the precise display content of the image can be traced back. This pixel-level metadata information is additionally added to the bit-level image information without distorting the image signal at its origin. The pixel-resolved image data is displayed to a user in accordance with how it was initially created.

The binary code is advantageously added to the color bit information by an image-data-generating unit, which transmits the data stream of the color bit information to an image-data-outputting unit. The image data is rendered in a rendering unit and the classifying binary code is introduced in accordance with a safety rating of the image data. By classifying the image data as early as in the rendering unit during image creation, incorrect treatment of the image data by an image-data-outputting unit and associated image enhancer is avoided. An image enhancer is understood to mean a software module known from the prior art or a device with a software module that optimizes an image before display on a display device by means of image enhancement technology, for example with regard to color, contrast, brightness, sharpness, resolution, noise, etc. For the purpose of the present disclosure, the term image encompasses any type of display on a display device, i.e., for example symbols, images, text, or animation.

In one embodiment, prior to transmission of the image to be displayed to a display unit, the at least one pixel comprising the classifying binary code is read out from the data steam received from the unit that generates and outputs image data, wherein, depending on the classifying binary code of the at least one pixel, a decision is made prior to transmission to a display unit about how to perform an image enhancement and the latter is implemented accordingly. Separating the information about the image data and the binary code allows an accurate evaluation of the binary code, from which the safety rating of the image to be displayed can be precisely identified before the image is displayed.

In one variant, the read-out classifying binary code of the at least one pixel is replaced by the color value bit originally stored in the pixel prior to the binary code, wherein the image to be displayed is modified in accordance with an associated classifying binary code in the image enhancement process. Once the image enhancer has received an instruction on how to perform the image enhancement process after reading out the classifying binary code, prior to the image enhancement process being performed, the classifying binary code is replaced by the original color value bit stored in the pixel before the binary code was introduced. Advantageously, the color value of the image supplied to the image enhancer corresponds exactly to the color value of the image before the classifying binary code was introduced. Without loss of quality, the color pixels rated as safety-relevant "ASIL" fulfil the requirements with regard to the specified safety ratings, the pixels classified as non-critical can be optimized to the full extent in the image enhancement process.

In one embodiment, the color value bits of the image to be displayed that are output after the image enhancement process are checked to establish whether the image to be output is output in accordance with the safety ratings specified by the associated binary code. For this purpose, the image generated by the rendering unit before the binary code was introduced is compared with the image to be displayed. In particular, the comparison for images with a high ASIL classification, i.e., for images where the images before the binary code is introduced and the images sent by receiver unit to the display unit must match, can reliably detect an error or a deviation and, if necessary, issue a safety warning or initiate corrective action. This creates a redundancy by means of which the safety rating of the image to be displayed is checked once again.

In a further embodiment, one bit is reserved for the binary code in a specified color of the RGB information. This results in two classification states.

In an alternative, one pixel of each color of the RGB information is reserved for the binary code. This increases the number of classification states.

A further increase in the number of classification states is made possible if one bit is reserved for the binary code with each new data frame alternately in the bit information of the colors RGB. Furthermore, the image-data-outputting unit detects an image freeze as soon as the classification bit fails to change between the bit information of the color values.

Alternatively, additional LSB information is provided in the frame with a specified color depth for the binary code. Thus, any number of pixels per color can be added, which makes a high degree of classification diversity possible.

In a further embodiment, a supplementary channel of a color encoding, i.e., for example of one or more of the bits of an RGBA color encoding provided for transparency or the bits of an RGBW code provided for color white fraction, is used for an ASIL-classifying binary code as meta-information. The supplementary channel comprises a plurality of bits or a byte. The A channel (alpha) and the W channel, each supplementing a color encoding, in principle supplement the three color bytes for R, G, and B by a fourth byte in each case, into which the classifying binary code is introduced. The RGB data is transmitted in a compressed format for a reduction of the data volume for transmission in a data channel from a transmitter unit in the form, for example, of a rendering unit to an image-processing and image-outputting receiver unit. Advantageously, no compression takes place for the supplementary channel, i.e., also for the bytes of the A or W channel, so that outputting an incorrect classifying binary code due to compression or decompression errors is ruled out.

A further aspect of the invention relates to a device for securely displaying ASIL-relevant data on a display device of a motor vehicle, comprising an image-data-generating unit and an image-data-outputting unit which communicate via a data stream, wherein the image-data-outputting unit is connected to a display unit. The image-data-generating unit introduces additional information about a safety rating of the image data to be displayed into the data stream by a classifying binary code in color bit information of at least one pixel of the image data, thereby classifying it with respect to the safety ratings in order to control a change in the safety-relevant display of images during an image enhancement process in the image-data-outputting unit to minimize or eliminate image enhancement processes entirely.

Further advantages, features and details result from the following description in which at least one exemplary embodiment is described in detail—where appropriate with reference to the drawing. Any features described and/or illustrated in the drawing may form part of the subject matter of the invention individually or in any meaningful combination, if appropriate also independently of the claims, and may in particular additionally be the subject matter of one or more separate application(s). Identical, similar and/or functionally identical parts are provided with the same reference signs.

BRIEF DESCRIPTION OF THE DRAWING FIGURES

Figure 2:
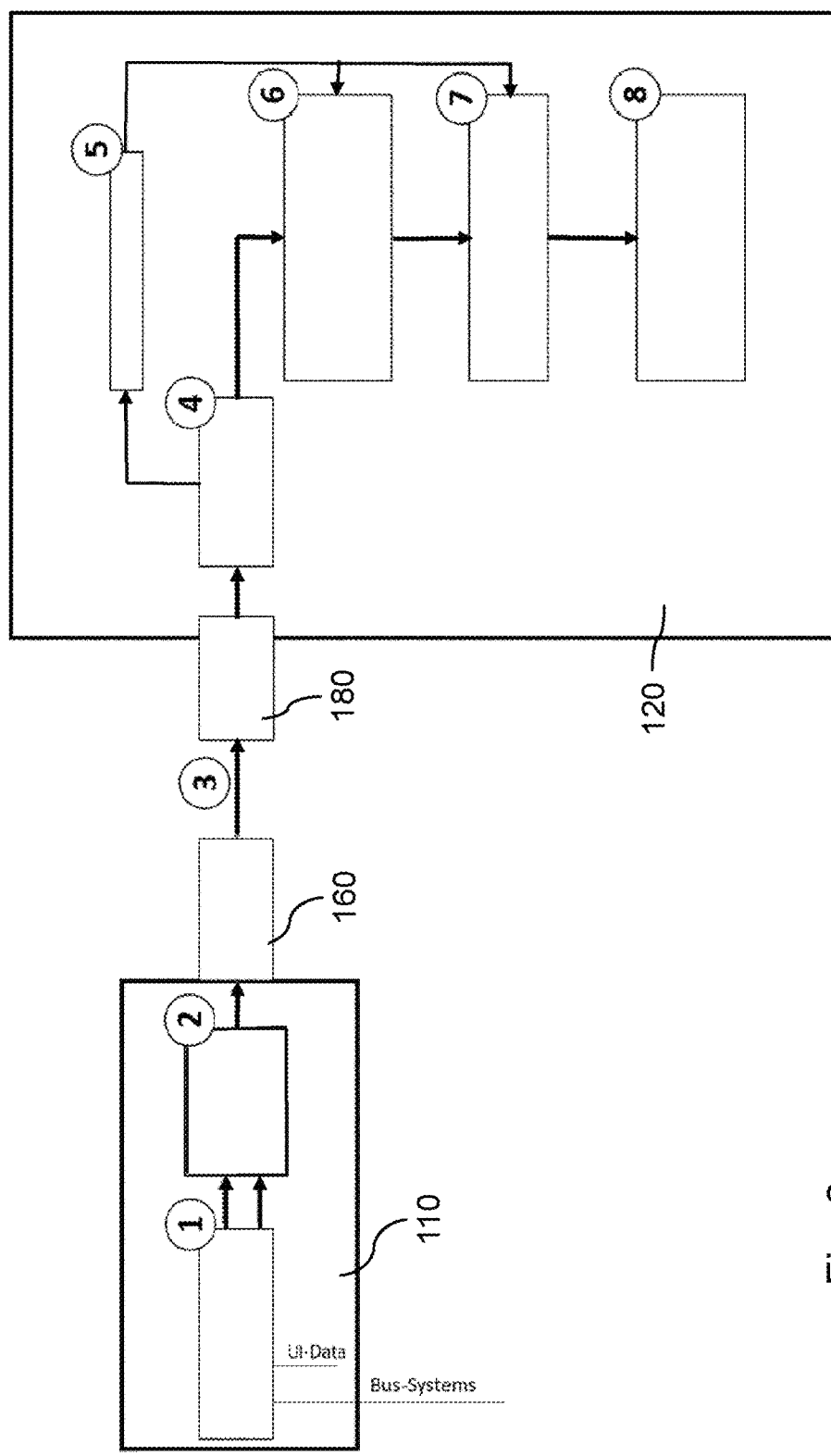
Figure 3:
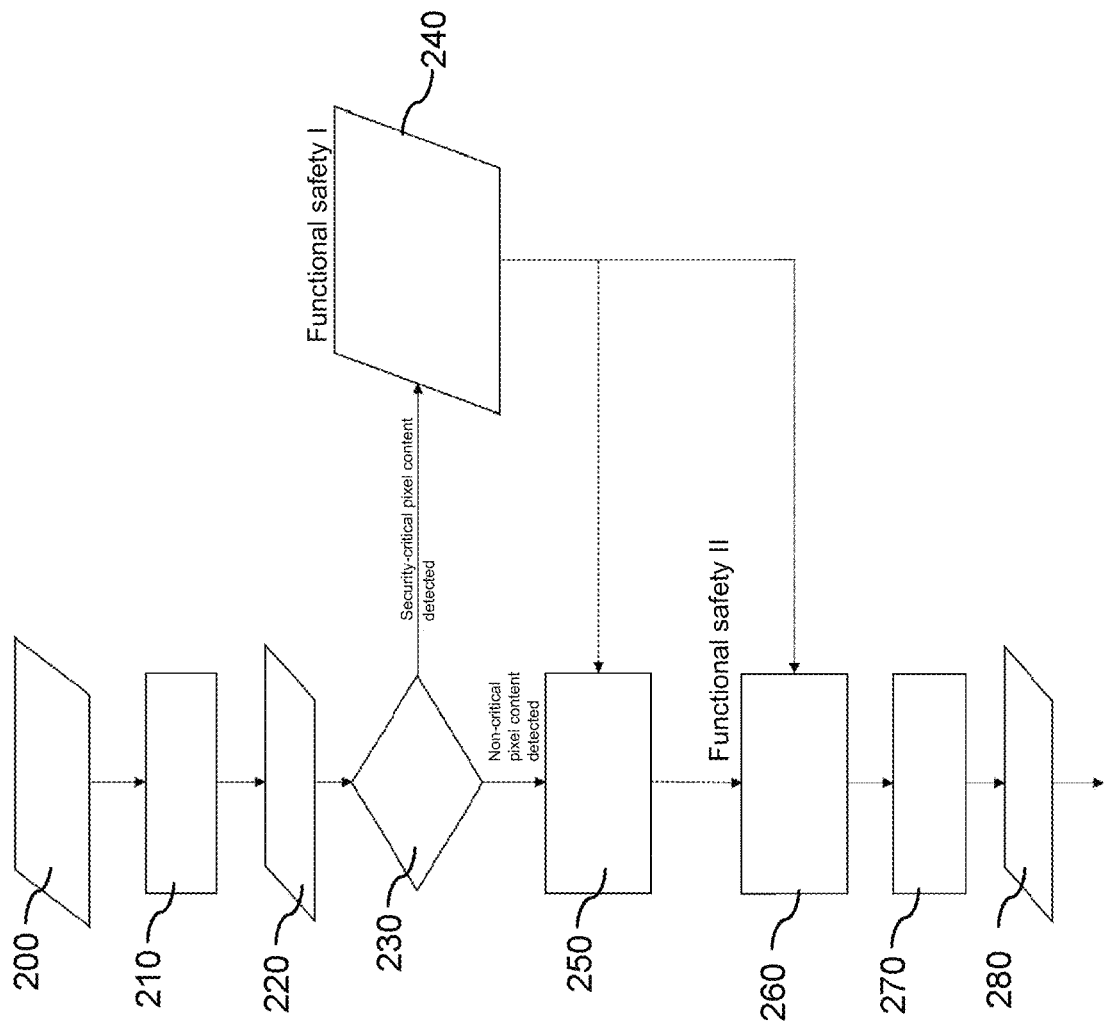
Figure 4:
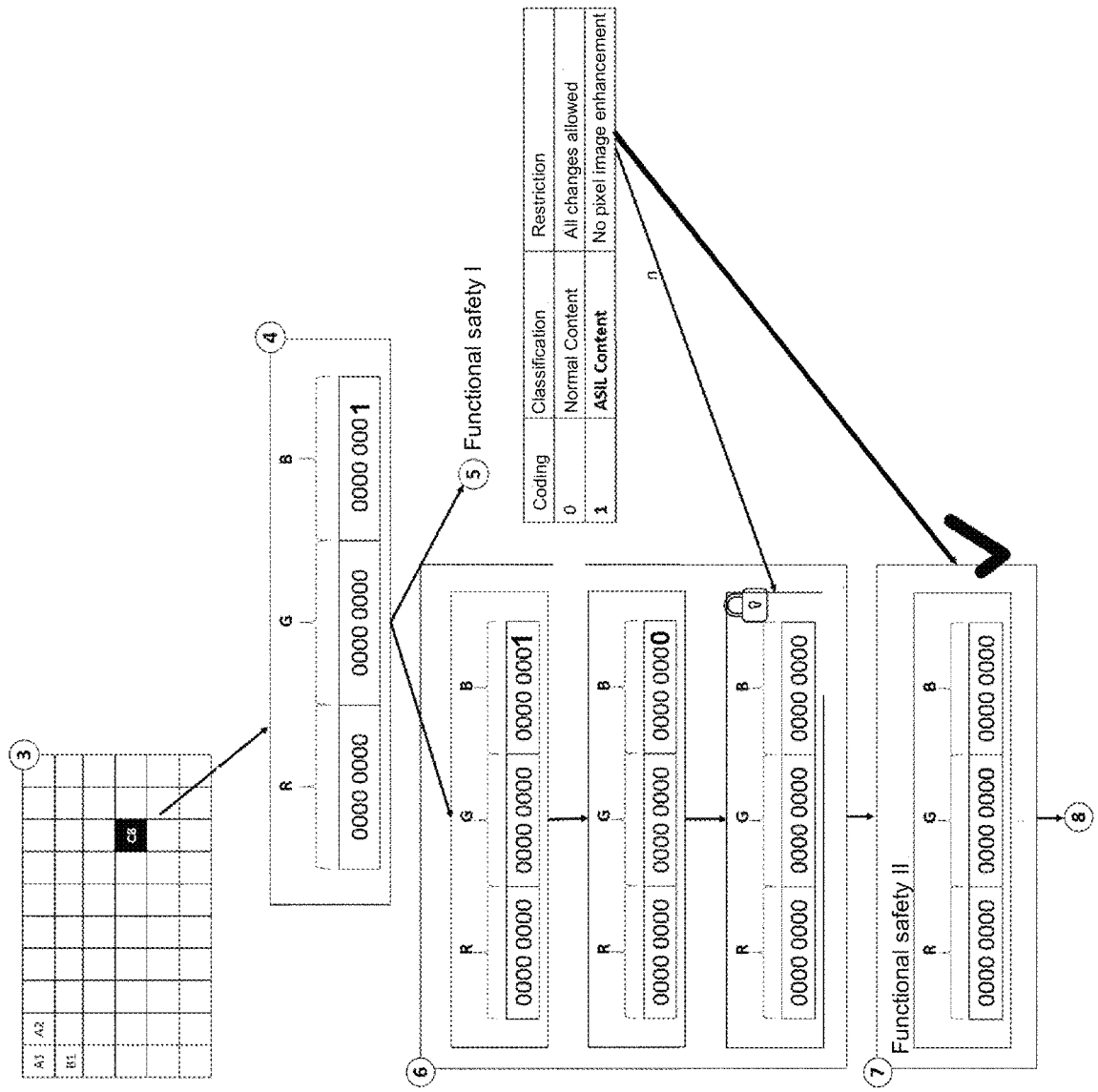
Figure 5:
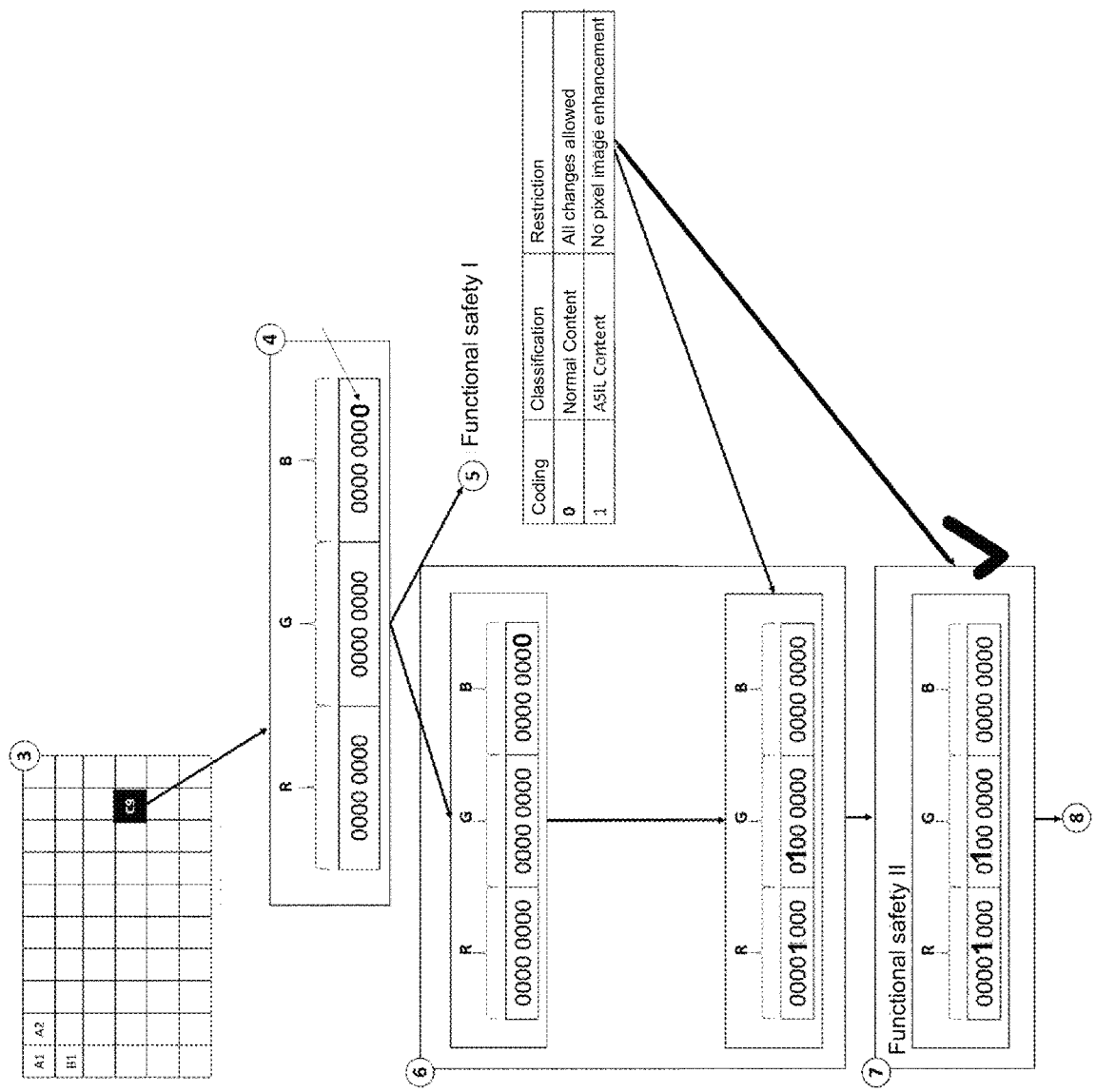
Figure 6:
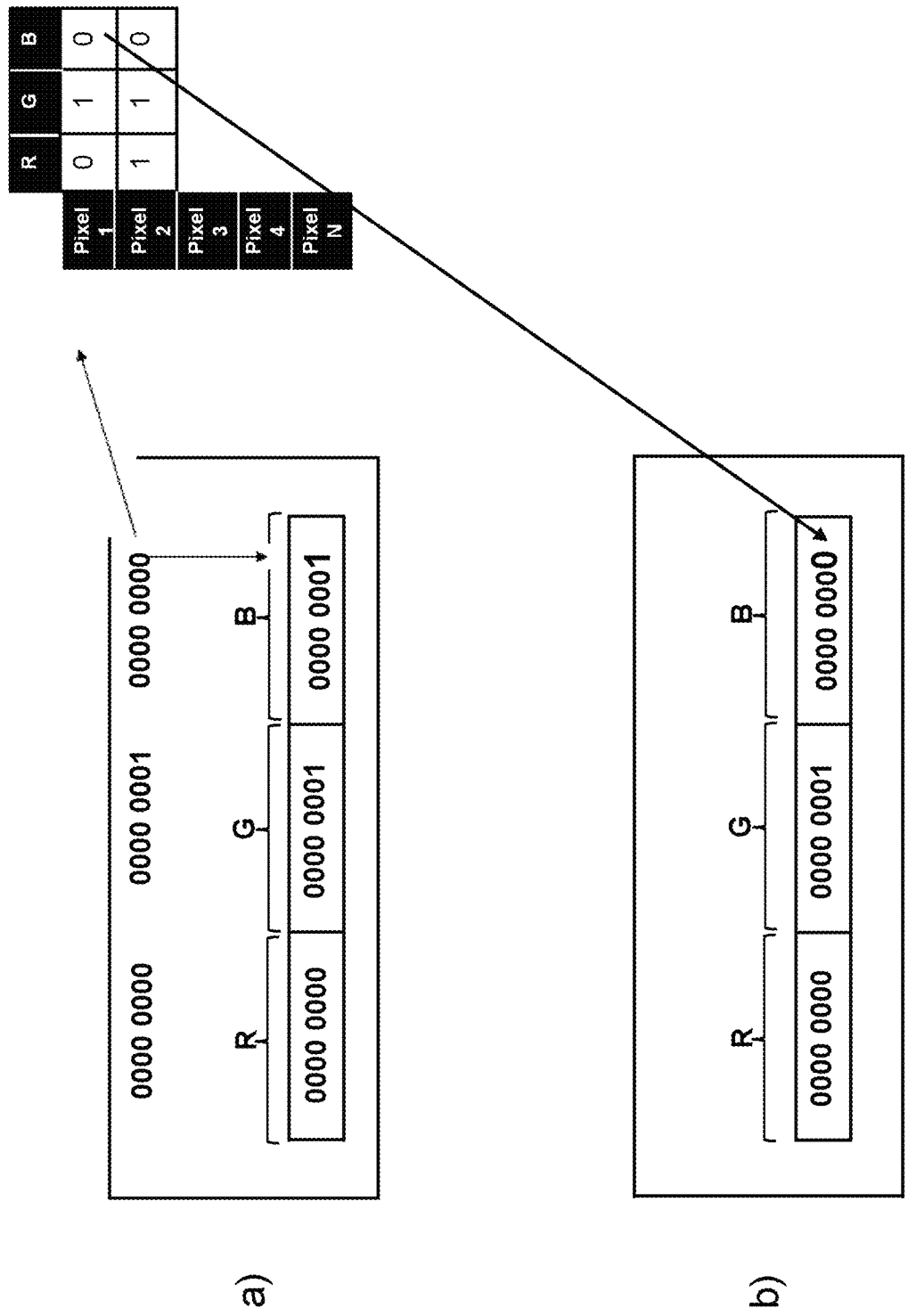
Figure 7A:
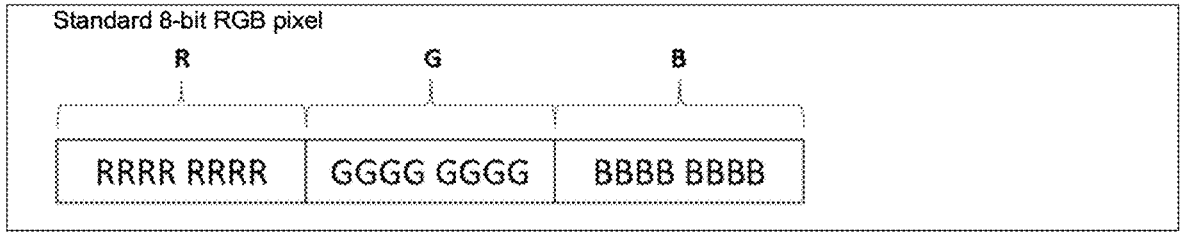
Figure 7B:
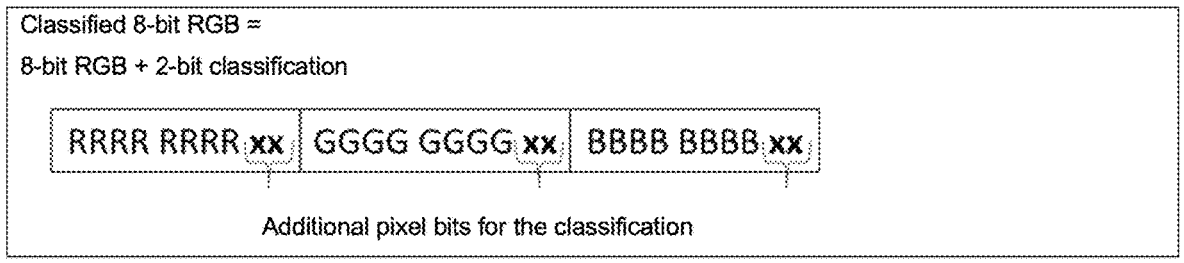
Figure 7C:
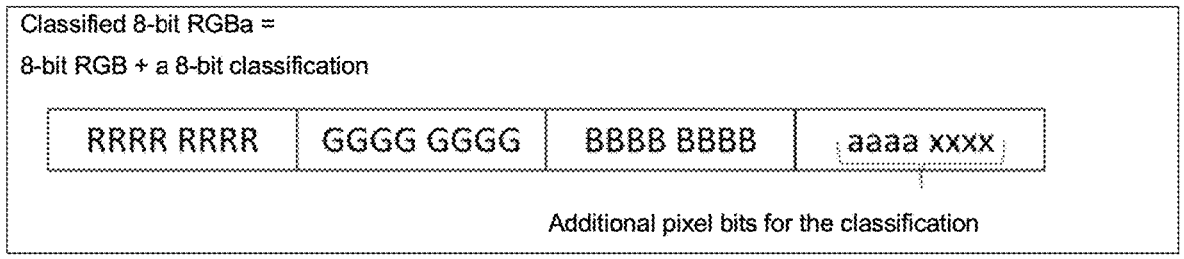

In the drawing:

FIG. 1 shows a schematic diagram of the device according to the invention,

FIG. 2 shows an exemplary embodiment of the method according to the invention with the device as per FIG. 1 with a two-stage functional safety process in the receiver unit, FIG. 3 shows an exemplary embodiment of a flowchart in the receiver unit, FIG. 4 shows an exemplary embodiment for processing ASIL-classifying pixels in the receiver unit, FIG. 5 shows an exemplary embodiment for processing non-ASIL-classifying pixels in the receiver unit, FIG. 6 shows an exemplary embodiment of introducing a classifying bit and subsequently replacing it with a bit of the original image data, and FIGS. 7A-7C shows an exemplary embodiment of classification possibilities using an 8-bit RGB.

FIG. 1 shows a schematic diagram of the device according to the invention. The device 100 consists of a transmitter unit 110 and a receiver unit 120, both of which process image data that is displayed in a display unit 130, which is part of the receiver unit 120. The transmitter unit 110, which is a rendering unit for generating an image from raw data, comprises a first layer 140, in which non-critically classified pixel layers are introduced into an image. In a second layer 150, which is a secure unit, safety-critically classified picture elements are introduced into the image. The criticality of the pixel layers used to generate the images depends, for example, on whether the images render displays for an ASIL-relevant system such as a system for automated driving or for non-secure systems such as an entertainment system. The image content, which is rendered in full by the transmitter unit 110 and classified at pixel level, is formed in a serializer 160 into a compressed data stream, which is transmitted via a video transmission link 170 to the receiver unit 120, where it is decompressed again by means of a deserializer 180 and converted into image information. The receiver unit 120 receives the transmitted image information by means of a controller 190. Depending on whether the pixels of the image information are safety-critical (ASIL-relevant) or non-critical, which is determined by a pixel content mapping that enables a classification into safety ratings, the image to be displayed is modulated in an image enhancer (125), i.e., in an image enhancement process, or not, and supplied to the display unit 130 of the receiver unit 120.

FIG. 2 shows an exemplary embodiment of the method according to the invention with the device 100 as per FIG. 1 with a two-stage functional safety process in the receiver unit 120. In function 1, internal and external information relevant to visualization, preferably vehicle information, is collected in the transmitter unit 110. The visualization-relevant parameters are linked to the image information, in this case a pixel color content, for the image synthesis. Subsequently, in function 2, the image information is merged, i.e., rendered, with metadata, which includes a safety rating of the binary code classifying image information, for pixel-precise type casting to form image information. Following the transmission of the rendered image information from the transmitter unit 110 to the receiver unit 120 (function 3), a pixel-by-pixel separation of the data stream of the image to be displayed into display information (color and position) and metadata (classification and position) takes place in function 4. The metadata provides a pixel-precise statement about ASIL-relevant classifications in safety ratings, while the display information determines the pixel color. In a first functional safety level 5, the rating classification of each pixel is checked. In response to detected ASIL-relevant metadata, the system receives corresponding feedback with rules for the image enhancement process and the display process according to predefined parameters, derived e.g., in a lookup table. These rules are supplied to the image enhancement process and the display unit 130. Depending on these rules and the results of the functional safety level 5, in function 6 the image enhancement process processes each pixel as per the applicable rules as a function of the pixel classification. In accordance with function 7 it is checked whether the applicable rules of the pixel-based modification or optimization for the intended display have been complied with. This involves a pixel-by-pixel comparison of the values received by the receiver unit with the values to be output to the display unit, for example with a hash value algorithm. If the values match, in function 8 the image information is transferred to the drivers for visualization in the display unit.

As described, for each frame transmitted between the transmitter unit 110 and the receiver unit 120 on the video transmission link 170, the transmitter unit 110 adds information to the pixels of the image as to what type of image it is. This is done by an RGB pixel classification mapping. The classification at RGB pixel level depends on the number of bits provided and is carried out in the respective LSB data (Least Significant Bit data) of the RGB matrix. The classification possibilities shall be illustrated using an 8-bit RGB pixel as illustrated in FIGS. 7A-7C.

Hereinafter, some possible characteristics of the RGB-based pixel formatting scheme will be explained by way of example.

1. Reservation of one LSB pixel in the color blue B, resulting in two classification states
   R=8, G=8, B=8→R=8, G=8, B=7+x RRRRRRRR GGGGGGGG BBBBBBBB→RRRRRRRR GGGGGGGG BBBBBBBx
2. Reservation of 1 bit per color, resulting in 8 classification states
   R=8, G=8, B=8→R=7+x, G=7+x, B=7+x RRRRRRRR GGGGGGGG BBBBBBBB→RRRRRRRx GGGGGGGx BBBBBBBx
3. Reservation of 1 bit of one color per data frame, resulting in 8 classification states over three data frames. This is a frame-based iterative pixel classification without significant image losses. With each frame, the classification bit alternates between the bit code of the colors red, green and blue.
   Data frame 1
   R=8, G=8, B=8→R=7+x, G=8, B=8 RRRRRRRR GGGGGGGG BBBBBBBB→RRRRRRRx GGGGGGGG BBBBBBBB
   Data frame 2:
   R=8, G=8, B=8→R=8, G=7+x, B=8 RRRRRRRR GGGGGGGG BBBBBBBB→RRRRRRRR GGGGGGGx BBBBBBBB
   Data frame 3:
   R=8, G=8, B=8→R=8, G=8, B=7+x RRRRRRRR GGGGGGGG BBBBBBBB→RRRRRRRR GGGGGGGG BBBBBBBx
4. Additional provision of LSB information in the frame with 10-bit color depth, resulting in classification states 1 to N
   R=10, G=10, B=10→R=10−n+n*x, G=10−n+n*x, B=10−n+n*x; for n=3
   RRRRRRRRRR GGGGGGGGGG BBBBBBBBBB→RRRRRRRxxx GGGGGGGxxx BBBBBBBxxx
5. Additional provision of meta-information by encoding in an additional channel (alpha and white)
   R=8, G=8, B=8, A=8→R=8, G=8, B=8, A=(A+x)=8 RRRRRRRR GGGGGGGG BBBBBBBB aaaaaaaa→RRRRRRRR GGGGGGGG BBBBBBBB aaaaxxxx In all classification cases presented, x stands for the reserved bit for the LSB formatting.

FIG. 3 shows an exemplary embodiment of a flowchart in the controller 190 of the receiver unit 120. In block 200, the entire image is read in the form of matrix pixel data. The individual pixels are extracted in block 210 and read in a checking process in block 220. Subsequently, in block 230, the individual pixels are checked to determine which pixel type they are. If safety-critical pixel content is detected using a classifying binary code, the next step is block 240, in which restrictive criteria for a pixel manipulation are defined. This can be, for example, a protection against changes. The process then continues to block 250, to which the data of pixels whose non-critical content was detected in block 230 is also forwarded. Image enhancement of the image data takes place in this block 250 if the checked pixels comprise non-critical pixel content. If a pixel with safety-critical content has been detected in block 230, the image data is only processed to a limited extent within the scope of the permitted restrictive criteria. The process proceeds from block 250 to block 260, where a check is made for compliance with the applicable check criteria, which are also defined in block 240 for the pixels with safety-critical content. In block 270, the pixel classification is removed from the image data, which data is replaced by the original single pixel data in block 280.

FIG. 4 shows an exemplary embodiment for processing ASIL-classified pixels in the receiver unit 120. In function 3, as already explained, the image data is transmitted from the transmitter unit 110 to the receiver unit 120 and converted into an entire image pixel matrix in the receiver unit 120. In function 4, the entire image is separated pixel by pixel. In the following, for example the 8th bit of the blue value, (B8), is considered, which comprises as display information (color 00000000 00000000 00000001) and metadata (classification 1). In the first functional level 5, the rating classification of the bit B8 is checked. The result of the evaluation gives classification level 1=ASIL pixel. In the function step 6, the classification bit is replaced by a buffered bit associated with the original image information, i.e., in the present case the bit B8 is replaced, i.e., the bit is reset from 1 to the image value 0. Further, in function 6, the image enhancement process is performed to process the pixels of the image information RGB according to the applicable criteria depending on the parameters given by the ASIL pixel classification. Thereafter, the binary code 1 means that no pixel image enhancement of the image associated with bit B8 may be performed (first functional safety level 5). A check is performed in function 7 as to whether the criteria for pixel-based modification or optimization specified in the first functional safety level 5 have been complied with. If the result is positive, the image data is transferred in function 8 to the drivers for visualization in the display unit 130. If the result is negative, an emergency strategy is adopted, for example the function of the image enhancer is switched off, a replacement value is formed or a message about a malfunction is issued to a vehicle user.

FIG. 5 shows an exemplary embodiment for processing non-ASIL-classified pixels in the receiver unit 120. The functions 3 and 4 correspond to those explained in connection with FIG. 4. In this case, it is not necessary to exchange the classification bit for a color value bit of the original image, as both have the value 0. However, in this case, the classifying bit B8 includes a 0 as classification bit information, which indicates a non-safety-critical content, which is why changes to the image associated with the bit B8 are permitted during the image enhancement process, which also takes place in function 6. Here, too, function 7 is used to check the criteria specified in the first functional safety level 5. Since the image that comprises pixel B8 has non-critical content, there are no additional checking criteria, so the pixel values are output to the display unit 130 in the modified-in-function-6, i.e., image-enhanced, form.

As shown in more detail in FIG. 6, the meta-information is replaced by its original color information of the last or previous image, which is done, in particular, by means of buffering a number of possibly changed color value bits per pixel in the controller 190. In the present example, the buffering is explained using the pixel formatting scheme described in FIG. 3 above, in which the classification bit is alternately written into the bit information of the RGB color values. In the LSB bit of the color blue, the ASIL classification bit 1 is encoded as a classifying binary code as per the description with regard to FIG. 2 in function 2 or in the associated method step. The LSB color value bit of the original pixel of blue that was valid before encoding is buffered with the color value bits of red and green, as indicated by an arrow, see FIG. 6a. The classification bit is read out to define the ASIL relevance of the pixel or image associated with the bit in accordance with function 5 in FIG. 4. In function 6, the classification bit is overwritten again by the buffered bit for the color value, i.e., the classification bit is replaced by the value 0 as shown in FIG. 6b. The original pixel or the original image associated with the pixel that is thus present prior to the encoding is treated in the image enhancer in accordance with the read-out classification bit, i.e., output in the present case without enhancement. Accordingly, a classification bit encoded in the color red or blue is replaced by the buffered LSB bits of the original image prior to transmission to the image enhancer.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for securely displaying ASIL-relevant data on a display device of a motor vehicle, the display device comprising a transmitter unit, a receiver unit, and a display unit configured to display images output by the receiver unit, wherein
    images having higher safety ratings are shown on the display unit with less modification by an image enhancement process in comparison with images having lower safety ratings, and
    information about the safety rating of an image to be displayed is introduced by the transmitter unit into a data stream by a classifying binary code in color bit information of at least one pixel of the image to be displayed via a pixel matrix to control a change to the image during the image enhancement process in an image enhancer associated with the image-data-outputting receiver unit for images of all safety ratings,
    wherein a read-out binary code of the at least one pixel is replaced by the color value bit originally stored in the pixel prior to the binary code, wherein the image to be displayed is modified in accordance with an associated classifying binary code in the image enhancement process.

2. The method of claim 1, wherein prior to transmission of the image to be displayed comprising the pixel to the display unit, the classifying binary code of the at least one pixel is read out from the data stream received from the receiver unit that outputs the image data, wherein, depending on the binary code of the at least one pixel, a decision is made about performing an image enhancement.

3. The method of claim 1, wherein color value bits of the image to be displayed that are output after the image enhancement process are checked to establish whether the image to be output is output in accordance with safety ratings specified by the associated binary code.

4. The method of claim 1, wherein one bit is reserved in a specified color of RGB information for the binary code.

5. The method of claim 1, wherein one bit of each color of RGB information is reserved for the binary code.

6. The method of claim 1, wherein one bit of a specified color is reserved alternately in data frames for the binary code.

7. The method of claim 1, wherein for the binary code, additional least significant bit data is provided in a frame with a specified color depth or bits are reserved in a supplementary channel of an RGBA or RGBW color encoding.

8. A device for securely displaying ASIL-relevant data on a display device of a motor vehicle, the device comprising:
    an image-data-generating transmitter unit;
    an image-data-outputting receiver unit, which is configured to communicate with the image-data-generating transmitter unit via a data stream; and
    a display unit configured to display images output by the receiver unit,
    wherein the image-data-generating transmitter unit is configured to introduce additional information about a safety rating of image data to be displayed into a pixel of the image data as classifying binary code to control a modification of the image during an image enhancement process in an image enhancer associated with the image-data-outputting receiver unit for images of all safety ratings,
    wherein a read-out binary code of the at least one pixel is replaced by the color value bit originally stored in the pixel prior to the binary code, wherein the image to be displayed is modified in accordance with an associated classifying binary code in the image enhancement process.

* * * * *